(12) United States Patent
Drost

(10) Patent No.: US 9,339,143 B2
(45) Date of Patent: May 17, 2016

(54) METHOD FOR DETERMINING AT LEAST ONE SUITABLE PARAMETER FOR A PROCESS OF MAKING A BEVERAGE

(71) Applicant: KONINKLIJKE PHILIPS N.V., Eindhoven (NL)

(72) Inventor: Edwin Wilco Drost, Zwolle (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 349 days.

(21) Appl. No.: 13/927,134

(22) Filed: Jun. 26, 2013

(65) Prior Publication Data

US 2013/0287906 A1    Oct. 31, 2013

Related U.S. Application Data

(63) Continuation of application No. 12/530,629, filed as application No. PCT/IB2008/051014 on Mar. 18, 2008, now Pat. No. 8,490,541.

(30) Foreign Application Priority Data

Mar. 20, 2007    (EP) ..................................... 07104491

(51) Int. Cl.
*A47J 31/40*    (2006.01)
*A47J 31/44*    (2006.01)
*A47J 31/06*    (2006.01)
*A47J 31/36*    (2006.01)

(52) U.S. Cl.
CPC .......... *A47J 31/4492* (2013.01); *A47J 31/0668* (2013.01); *A47J 31/369* (2013.01)

(58) Field of Classification Search
CPC .. A47J 31/369; A47J 31/0668; A47J 31/4492
USPC .................... 99/279, 280, 295; 426/112, 231; 702/25, 45
See application file for complete search history.

(56) References Cited

U.S. PATENT DOCUMENTS

| | | | |
|---|---|---|---|
| 6,758,139 | B2 | 7/2004 | Knoll |
| 2004/0083898 | A1 | 5/2004 | Doglioni |
| 2004/0197444 | A1 | 10/2004 | Halliday et al. |

(Continued)

FOREIGN PATENT DOCUMENTS

| | | | | |
|---|---|---|---|---|
| CN | 1320815 A | | 11/2001 | |
| EP | 1676509 A1 | * | 7/2006 | .............. A47J 31/44 |

(Continued)

*Primary Examiner* — Thien S Tran

(57) ABSTRACT

A method for determining a suitable parameter for a process of making a beverage by conducting fluid through at least one member containing at least one beverage ingredient in a beverage maker that receives and processes various types of beverage ingredient containing members, the method includes realizing a flow of fluid through a beverage ingredient containing member of a particular type; and measuring a characteristic of the flow which is influenced by a flow resistance of the beverage ingredient containing member. The method further includes comparing the measured flow characteristic to a set of predetermined flow characteristics associated with the various types of beverage ingredient containing members; and determining at least one parameter for a further process of making a beverage by selecting a parameter related to the predetermined flow characteristic to which the measured flow characteristic is closest.

7 Claims, 3 Drawing Sheets

(56) References Cited

U.S. PATENT DOCUMENTS

| | | |
|---|---|---|
| 2005/0183578 A1 | 8/2005 | Mandralis et al. |
| 2005/0279222 A1 | 12/2005 | Nevarez et al. |
| 2006/0096465 A1* | 5/2006 | Hu et al. .......................... 99/280 |
| 2007/0149863 A1* | 6/2007 | Padmanabhan et al. ...... 600/309 |

FOREIGN PATENT DOCUMENTS

| | | |
|---|---|---|
| GB | 2413096 A | 10/2005 |
| WO | 02085170 A2 | 10/2002 |
| WO | 2006070257 A2 | 7/2006 |

* cited by examiner

METHOD FOR DETERMINING AT LEAST ONE SUITABLE PARAMETER FOR A PROCESS OF MAKING A BEVERAGE

This application claims the benefit or priority of and describes the relationships between the following applications: wherein this application is a continuation of U.S. patent application Ser. No. 12/530,629, filed Sep. 10, 2009, which is the National Stage of International Application No. PCT/IB2008/051014, filed Mar. 18, 2008, which claims the priority of foreign application EPO 07104491.1 filed Mar. 20, 2007, all of which are incorporated herein in whole by reference.

The present invention relates to a method for determining at least one suitable parameter for a process of making a beverage by conducting fluid through at least one member containing at least one beverage ingredient in a beverage maker which is adapted to receive and process various types of beverage ingredient containing members.

Many types of beverage makers are adapted to make various types of beverages. Especially in beverage makers which are adapted to receive and process members containing one or more beverage ingredients, the type of beverage which is made by the beverage maker is dependent on the type of beverage ingredient containing member as applied by a user of the beverage maker. For example, when a user decides to apply a member containing grind coffee, the beverage maker is used to make coffee, and when a user decides to apply a member containing tea leafs, the same beverage maker is used to make tea.

Each type of beverage requires a specific set of parameters in respect of the process of making the beverage, in order to obtain a required quality (taste) of the beverage. Such parameters may be temperature, flow, pressure and/or quantity of water which is to be conducted through the beverage ingredient containing member in this process, variation of the temperature, flow and/or pressure over time, pre-wetting parameters, pumping time, etc. In order to achieve that the beverage maker is capable of automatically selecting the proper parameters in respect of at least one beverage ingredient containing member which needs to be processed by the beverage maker, it is necessary that the beverage maker is capable of recognizing the beverage ingredient containing member.

A system for automatically preparing a range of beverage types from a range of beverage cartridges is known from US 2004/0197444. This system comprises a beverage preparation machine and a plurality of beverage cartridges, each cartridge containing one or more beverage ingredients associated with a specific beverage type. For the purpose of preparing a beverage by means of the system, a user inserts a beverage cartridge in the beverage preparation machine and operates the machine to supply to the beverage cartridge water or another suitable medium, as a result of which a beverage is produced from the one or more beverage ingredients contained in the beverage cartridge.

For the purpose of recognizing the beverage cartridge and performing a suitable brewing cycle, the beverage preparation system known from US 2004/0197444 comprises a reader in the beverage preparation machine for automatically interpreting a code written on the beverage cartridge, and processing means for creating a specific brewing cycle based on this code. In a practical embodiment of the system, the reader may be an optical barcode reader, and the code written on the beverage cartridge may be a printed barcode.

Although the known system having means for recognizing beverage cartridges functions quite well in practice, there are a number of disadvantages associated with it. In the first place, only beverage cartridges having a code written on it can be used and automatically recognized in the beverage preparation machine of the system, wherein this code needs to be a specific code which is stored in a memory of the processing means. In the second place, the code reader is a specific component in the beverage preparation machine, which is only used for the purpose of reading the cartridge information. By applying such a component, which would otherwise not need to be part of the beverage maker, a cost price of the system is raised.

It is an objective of the present invention to provide an alternative method for automatically recognizing beverage ingredient containing members in a beverage maker and determining at least one suitable parameter for performing a process of making a beverage by applying at least one beverage ingredient containing member, wherein it is not necessary to apply specific components in the beverage maker. This objective is achieved by a method which comprises the following steps:
  realizing a flow of fluid through the beverage ingredient containing member;
  measuring at least one characteristic of the obtained flow which is influenced by a flow resistance of the beverage ingredient containing member;
  comparing the measured flow characteristic to a set of predetermined flow characteristics associated with various types of beverage ingredient containing members;
  determining at least one parameter for a further process of making a beverage by selecting a parameter related to the predetermined flow characteristic to which the measured flow characteristic is closest.

According to the present invention, there is no need for using a code on the beverage ingredient containing member and a reader for reading this code in order to come to a recognition of the member. Instead, according to the present invention, a beverage ingredient containing member is recognized by realizing a flow of fluid through the beverage ingredient containing member, i.e. initiating a process of making the beverage, measuring at least one characteristic of the obtained flow, and comparing the measured characteristic to a set of predetermined characteristics associated with various types of beverage ingredient containing members. An insight underlying the present invention is that every type of beverage ingredient containing member has a unique resistance to a flow of fluid. Therefore, it is possible to use at least one characteristic of a flow which is realized as a measurement of the flow resistance of the beverage ingredient containing member. In this way, the beverage ingredient containing member can be recognized, and a suitable, predetermined way of further processing the member can be selected.

In particular, the determination of a suitable way of performing the process of making the beverage can take place by comparing the measured flow characteristic to a set of predetermined flow characteristics, wherein each predetermined flow characteristic is associated with a certain type of beverage ingredient containing member. The underlying assumption for doing so is that the measured flow characteristic is equal to or, in practice, close to one of the predetermined flow characteristics, namely the predetermined flow characteristic associated with the same type of beverage ingredient containing member as the type which is present in the flow of which the characteristic has been measured. Hence, when one or more parameters associated with the predetermined flow characteristic are applied in a further process of making the beverage, the beverage ingredient containing member is processed in the right way, and the beverage is made in the right way, yielding optimal quality of this beverage.

It is noted that the set of predetermined flow characteristics may in fact be a set of ranges, wherein it is checked whether the measured flow characteristic is within one of these ranges. Furthermore, it is noted that many existing types of beverage makers are equipped with a flow sensor and/or a pressure sensor, so that there is no need for adding components to a beverage maker when realizing the present invention. This is an important achievement of the present invention, taking into account the fact that solutions according to the state of the art do require the application of specific components such as barcode readers or RFID (radio frequency identification) readers.

In a practical way of carrying out the method according to the present invention, a pumping device is used for the purpose of pumping a fluid. Advantageously, the predetermined flow characteristics to which the measured flow characteristic is compared represent characteristics of a working point, i.e. a combination of flow and pressure which is both within a working range of the pumping device of the beverage maker and a range of combinations of flow and pressure related to the flow resistance of a beverage ingredient containing member. This will be further elucidated in the following.

The pumping device of the beverage maker is used for conducting a fluid, usually water, through a beverage ingredient containing member or a stack of at least two beverage ingredient containing members, while exerting a certain pressure, wherein the level of the pressure is dependent on the requirements for processing the applied type of beverage ingredient containing member(s), as has been explained in the foregoing. The functioning of the pumping device is often expressed in a so-called Q-H curve, which describes combinations of flow and pressure. For each level of functioning of the pumping device, at full power or a percentage thereof, a Q-H curve can be determined.

When the fluid is pumped through one or more beverage ingredient containing members, a pressure drop is obtained as a consequence of the flow resistance of the member(s). The relation between flow and pressure drop can also be expressed in a curve describing combinations of flow and pressure. Such a curve is usually referred to as resistance curve. Each beverage ingredient containing member or each stack of beverage ingredient containing members has a unique resistance curve, and the point where the resistance curve intersects a Q-H curve of the pumping device is a unique working point, i.e. a unique combination of flow and pressure. Thus, by letting the pumping device function according to a certain Q-H curve, and measuring at least one of the flow and the pressure at the beverage ingredient containing member(s), the actual working point may be determined, and may be compared to predetermined working points in order to find a suitable way of further processing the beverage ingredient containing member(s), provided that the necessary information is associated with each of the predetermined working points.

When the Q-H curve of the pumping device is known, it is sufficient to measure only one of the flow and the pressure, as in that case, information in respect of the other of the flow and the pressure follows from the Q-H curve, so that the working point may be found. However, within the scope of the present invention, it is also possible that only resistance curves of various types of beverage ingredient containing members, and number of these members in case it is a feasible option to use two or more members in a stack in the beverage maker, are known. In that case, the type of beverage ingredient containing member and possibly also the number of members is found on the basis of a match of the measured combination of flow and pressure with one of the predetermined resistance curves. However, it is preferred to measure only one of the flow and the pressure and to also make use of a Q-H curve of the pumping device in the process of finding a working point and an associated resistance curve, as in such a case, only one type of sensor is needed, and the application of only one sensor may be sufficient.

Preferably, the at least one characteristic of the flow which is measured for the purpose of determining at least one parameter for a further process of making a beverage is at least one of flow and pressure, as has already been noted. Nevertheless, within the scope of the present invention, it is also possible that other flow characteristics are measured, provided that these characteristics are related to particular features of the beverage ingredient containing members, so that these characteristics are suitable to be used in a process of determining at least one suitable parameter for processing the members.

In a practical way of carrying out the method according to the present invention, the at least one parameter which is determined for a process of making a beverage may be at least one of temperature, flow, pressure and quantity of a fluid to be conducted through the beverage ingredient containing member, variation of the temperature, flow and/or pressure over time, a pre-wetting parameter, and pumping time. In general, these parameters are known such as to influence the quality of the obtained beverage. For example, when the fluid is conducted through a quantity of grind coffee, when these parameters are not correctly set, the taste of the obtained coffee may be really bad.

Within the scope of the present invention, any suitable member may be applied as the beverage containing member. Preferred examples of such a member are a pad, a cup, a capsule and a cartridge.

The present invention also relates to a beverage maker which is adapted to perform a process of making a beverage by conducting fluid through at least one member containing at least one beverage ingredient, which is adapted to receive and process various types of beverage ingredient containing members, and which comprises the following components:
  controller means adapted to control the beverage maker by carrying out the steps of the method for determining at least one suitable parameter for a process of making a beverage as has been described and explained in the foregoing;
  detecting means for measuring at least one flow characteristic when a flow of fluid is realized; and
  memory means for storing a set of predetermined flow characteristics associated with various types of beverage ingredient containing members.

In a practical embodiment, the beverage maker according to the present invention further comprises a pumping device for pumping a fluid. Advantageously, the predetermined flow characteristics which are stored in the memory means represent characteristics of a working point, i.e. a combination of flow and pressure which is both within a working range of the pumping device and a range of combinations of flow and pressure related to the flow resistance of a beverage ingredient containing member, as has been explained in the foregoing. It is noted that the controller means may comprise a microcontroller, and that the memory means may be a memory of this microcontroller.

The detecting means of the beverage maker may comprise at least one sensor chosen from a group comprising a flow sensor and a pressure sensor, so that at least one of the flow and the pressure may be detected during operation of the beverage maker.

The above-described and other aspects of the present invention will be apparent from and elucidated with reference to the following description of a beverage maker according to the present invention and of a way of controlling the operation of the beverage maker depending on the type of beverage cartridge which is processed by the beverage maker.

The present invention will now be explained in greater detail with reference to the figures, in which.

Figure 1:
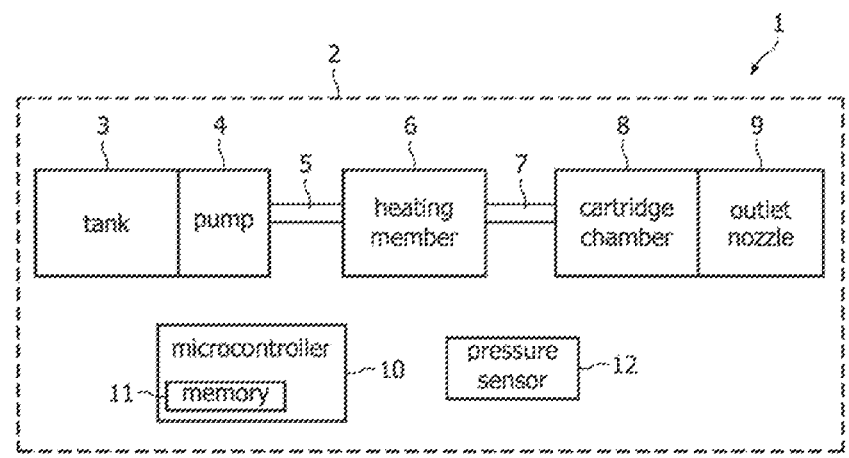
FIG. 1 is a block diagram showing various components of a beverage maker.

FIG. 1 diagrammatically shows various components of a beverage maker 1. This beverage maker 1 is to be regarded as an arbitrary example of a beverage maker which is adapted to perform a process of making a beverage by conducting fluid through at least one member containing at least one beverage ingredient, and which is adapted to receive and process various types of beverage ingredient containing members. For sake of clarity of the following description, it is assumed that a beverage cartridge (not shown) is used as a beverage ingredient containing member, which does not alter the fact that the application of other beverage ingredient containing members is feasible within the scope of the present invention. It is noted that in view of the fact that the present invention does not relate to the beverage ingredient containing members as such, and the fact that these members are well-known in practice, the constitution and functioning of these members will not be explained here.

The shown beverage maker 1 comprises a housing 2 for accommodating most of the components of the beverage maker 1. A number of these components will be mentioned and described in the following.

A first component of the beverage maker 1 is a tank 3 for containing water or another suitable fluid to be applied in a process of making a beverage. This tank 3 may be shaped in any suitable way. Preferably, the tank 3 is detachably arranged, so that a user of the beverage maker 1 is capable of bringing the tank 3 to a tap or the like in order to fill the tank 3, without having to move the entire beverage maker 1. The present invention is also applicable in the context of beverage makers which do not comprise a tank, but which are connected to some kind of fluid supplying system through a suitable closing device, such as a tap.

A second component of the beverage maker 1 is a pump 4 for forcing the fluid to flow through the beverage maker 1, wherein the pump 4 may be of any suitable type. It is noted that within the scope of the present invention, other means for pressurizing a fluid and forcing the fluid to flow through the beverage maker 1 may be applied, and that the pump 4 is not an essential component of the beverage maker 1.

A third component of the beverage maker 1 is a member 6 for heating the fluid. It is noted that this component is not an essential component of the beverage maker 1 according to the present invention, as the beverage maker 1 may also be suitable to only make cold beverages. However, when the beverage maker 1 is intended to be used for the purpose of making hot beverages such as tea or coffee, it is preferred if the beverage maker 1 is equipped with a heating member 6 as shown, in view of the fact that a supply of fluid will be cold in most cases.

The heating member 6 may be of any suitable type. The heating member 6 and the pump 4 are interconnected by means of a first tube 5. When the pump 4 is operated, the water is forced to flow from the pump 4 to the heating member 6, through the first tube 5.

A fourth shown component of the beverage maker 1 is a chamber 8, which is adapted to receive and accommodate at least one beverage cartridge. The cartridge chamber 8 and the heating member 6 are interconnected by means of a second tube 7. During operation, the actual process of making a beverage takes place inside the cartridge chamber 8, as in the cartridge chamber 8; the water is forced to flow through the beverage cartridge.

A fifth component of the beverage maker 1 is an outlet nozzle 9, which is connected to the cartridge chamber 8, and which serves for letting out freshly made beverage from the beverage maker 1.

A sixth component of the beverage maker 1 is a microcontroller 10 having a memory 11, which serves for controlling the operation of the beverage maker 1. Preferably, the beverage maker 1 comprises means (not shown) for allowing a user of the beverage maker 1 to supply input to the microcontroller 10, so that the beverage maker 1 may be operated in a way which is intended by the user.

When a user decides to apply the beverage maker 1 to make a beverage, he needs to provide at least one beverage cartridge and put the cartridge in place in the cartridge chamber 8 of the beverage maker 1. The beverage maker 1 may for example comprise a separate carrier (not shown) for receiving the beverage cartridge(s), which may easily be inserted in the cartridge chamber 8. Furthermore, the user needs to take care that there can be a supply of water to the cartridge chamber 8, wherein he needs to fill the tank 3 in case it appears that the tank 3 does not contain a sufficient quantity of fluid, and that at least one cup or the like is in a proper position for receiving the beverage from the beverage maker 1.

During the operation of the beverage maker 1, which is controlled by the microcontroller 10, fluid is pumped from the tank 3 to the cartridge chamber 8. In the process, the fluid is heated by the heating member 6. In the cartridge chamber 8, under the influence of the pressure exerted by the pump 4, the fluid is forced to flow through the beverage cartridge(s), and the desired beverage is obtained, which is subsequently emitted by the beverage maker 1, through the outlet nozzle 9.

Parameters for the process of making the beverage are automatically selected by the microcontroller 10. Examples of these parameters are temperature, flow, pressure and quantity of the fluid which is supplied to the cartridge chamber 8 and which is forced to flow through the beverage cartridge(s), variation of the temperature, flow and/or pressure over time, pre-wetting parameters, pumping time, etc. By choosing correct values of these parameters, it is ensured that the obtained beverage is of a good quality. The microcontroller 10 is adapted to perform a process of selecting optimal parameters.

Figure 2:
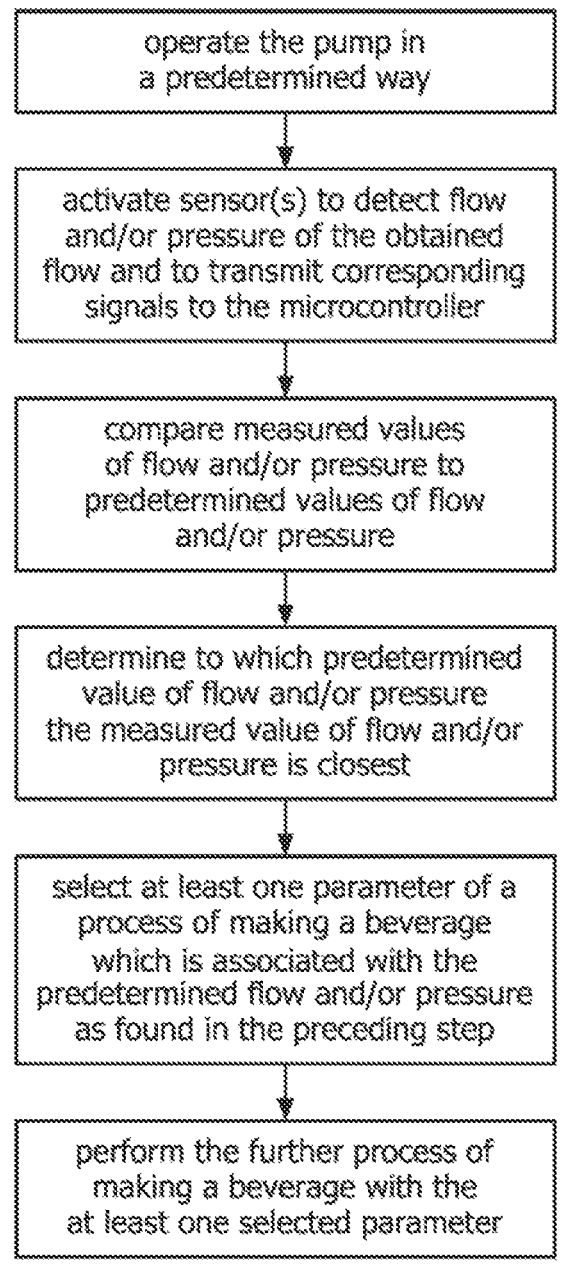
FIG. 2 is a flowchart showing a preferred series of steps which are followed when the beverage maker is operated.

The functioning of the microcontroller 10 during operation of the beverage maker 1 will be explained on the basis of FIG. 2, which shows various steps which are proposed by the present invention for the purpose of automatically determining suitable parameters for a process of making a beverage when at least one beverage cartridge has been put in place in the cartridge chamber 8.

Figure 3:
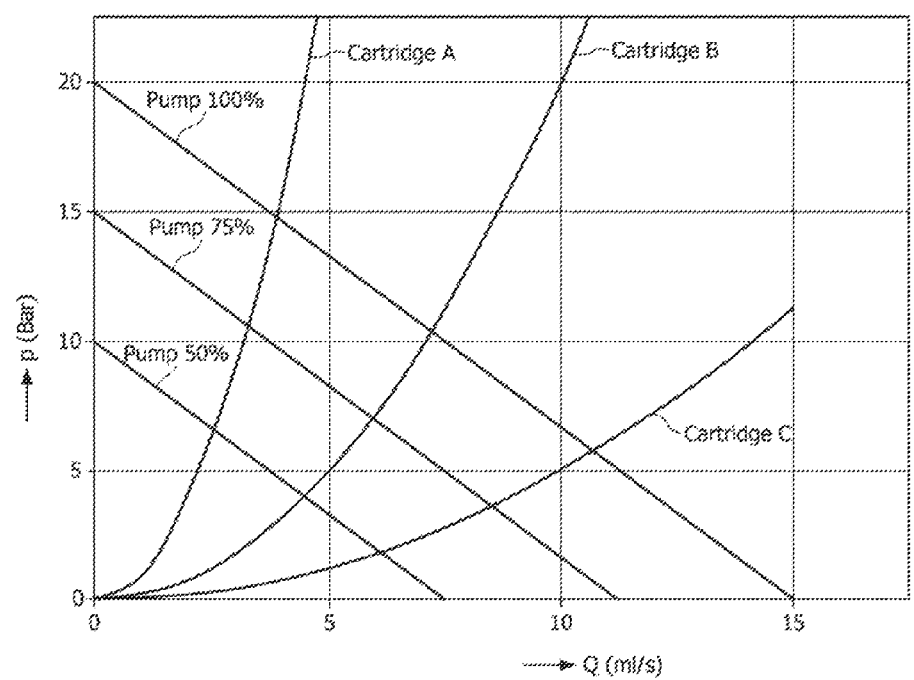
FIG. 3 is a graphical drawing depicting relations between flow and pressure for both a pump of the beverage maker and various beverage cartridges which may be processed by the beverage maker.

In the first place, after a user of the beverage maker 1 has activated the beverage maker 1, the pump 4 is operated in a predetermined way, for example, at a predetermined power level and a predetermined pressure level. In FIG. 3, various relations between flow and pressure for the pump 4 are shown in a graph. The respective curves are also referred to as Q-H curves. In the shown example, the pressure is expressed in bar, and the flow is expressed in milliliters per second. Furthermore, in the shown example, curves are drawn for the pump 4 operating at different power levels, namely 100%, 75%, and 50%. When the power level and the pressure level of the pump 4 are set, the obtained flow follows from the applicable Q-H curve.

Due to the fact that the beverage cartridge has a certain flow resistance, a pressure drop is obtained, and the flow is decreased. As each type of beverage cartridge has a unique flow resistance, the relation between flow and pressure drop is different for various types of beverage cartridges. Besides a number of Q-H curves, various curves showing a relation between flow and pressure drop for various types of beverage cartridges are also shown in the graph of FIG. 3. It is noted that these curves are also referred to as resistance curves. A so-called working point of the process of supplying fluid to a certain beverage cartridge under the influence of the pump 4 and forcing the fluid to flow through this beverage cartridge is found at the intersection point of the respective Q-H curve of the pump 4 and the respective resistance curve of the beverage cartridge.

When the user has inserted a beverage cartridge in the beverage maker 1 and the operation of the beverage maker 1 has just been initiated, the microcontroller 10 has not yet received any information regarding the parameters which are needed for the purpose of properly processing the beverage cartridge. In order to determine these parameters, the pump 4 is operated such as to force fluid to flow through the beverage cartridge. By measuring at least one characteristic of the flow which is realized during this operation of the beverage maker 1, the applicable parameters can be found.

For the purpose of measuring the at least one flow characteristic, the beverage maker 1 comprises at least one suitable sensor. In the shown example, the beverage maker 1 comprises a pressure sensor 12. In general, a step in the process of determining the parameters for the purpose of processing the beverage cartridge in the right way such as to obtain beverage of an optimal quality involves measuring at least one flow characteristic.

Information which is directly related to the measured flow characteristic is transmitted to the microcontroller 10, which is adapted to determine the working point on the basis of this information. For example, when both the applicable Q-H curve and a measured pressure are known, the working point is found on this Q-H curve, as it is the combination of the measured pressure and the flow which, according to the curve, is related to this flow. The working point which is found in this way is compared to the predetermined working points, i.e. the combinations of flow and pressure which are found at the intersections of the Q-H curve and the resistance curves, and which are stored in the memory 11 of the microcontroller 10. Assuming that one of the resistance curves is associated with the beverage cartridge of the type which has been placed in the beverage maker 1, the working point which has been determined on the basis of a measurement of the pressure should be close to the predetermined working point as present on the respective resistance curve. Therefore, the correct type of beverage cartridge is found by checking to which predetermined working point the measured working point is closest. This check may be performed by the microcontroller 10 in any suitable way.

Alternatively, it is also possible that only the resistance curves associated with the beverage cartridges are known, wherein the Q-H curves of the pump 4 are not known. In such a case, the actual working point may be found by measuring both the flow and the pressure. The correct type of beverage cartridge may then be found by checking which resistance curve is closest to the measured working point. For sake of completeness, it is noted that the beverage maker 1 needs to comprise at least one flow sensor and at least one pressure sensor in order to actually realize a determination of both the flow and the pressure. Furthermore, it is noted that this alternative way of finding the type of beverage cartridge is particularly suitable to be applied if the Q-H curves of the pump 4 have large variations.

In the memory 11 of the microcontroller 10, combinations of predetermined working points and at least one associated parameter for carrying out a process of making a beverage are stored. Hence, when a match with one of the predetermined working point has been made, the associated parameter is found, and the pump 4 and other components of the beverage maker 1 are controlled such as to realize this parameter, i.e. to carry out the process of making a beverage in the prescribed way. Assuming that the parameter is chosen such as to realize a beverage having optimal quality, this optimal quality is actually realized. In the process, there is no need for a user to supply information regarding the type of beverage cartridge to the microcontroller 10, and there is no need for a label, a code or the like on the cartridge and a suitable reader in the beverage maker 1, which are major advantages of the present invention.

It will be clear to a person skilled in the art that the scope of the present invention is not limited to the examples discussed in the foregoing, but that several amendments and modifications thereof are possible without deviating from the scope of the present invention as defined in the attached claims. While the present invention has been illustrated and described in detail in the figures and the description, such an illustration and description are to be considered illustrative or exemplary only, and not restrictive. The present invention is not limited to the disclosed embodiment.

Within the scope of the present invention, the fluid which is conducted through the beverage ingredient containing member may be any fluid which is suitable to be applied in a process for making a beverage. The fluid may be water, but may also be steam, for example.

Variations to the disclosed embodiment can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the present invention.

In the foregoing, a beverage maker 1 which comprises a chamber 8 for receiving at least one member containing at least one beverage ingredient is described. During operation of the beverage maker 1, fluid is conducted through the fluid ingredient containing member for the purpose of making a beverage. In order to be capable of determining suitable parameters for processing the beverage ingredient containing member, such as a temperature, a pressure, a flow and/or a quantity of the fluid which is to be conducted through the member for the purpose of making a beverage, the beverage maker 1 comprises means 12 for detecting at least one characteristic of a flow which is obtained when a flow of fluid is realized, wherein this characteristic is a characteristic which is influenced by a flow resistance of the member. Furthermore, the beverage maker 1 comprises processing means 10 for processing the detected characteristic, and memory means 11 in which predetermined values of the characteristic are stored, wherein each predetermined value is associated with a specific type of beverage ingredient containing member and at least one suitable parameter for processing the member. By finding the predetermined characteristic which is closest to the detected characteristic, a suitable parameter for processing the beverage ingredient containing member which is actually present in the beverage maker 1 is selected. In this way, optimal quality of the obtained beverage is guaranteed, without a need for applying specific components for determining the type of beverage ingredient containing member.

The invention claimed is:

1. A method for determining at least one suitable parameter for a process of making a beverage by conducting fluid through at least one member containing at least one beverage ingredient in a beverage maker which is adapted to receive and process various types of beverage ingredient containing members, the method comprising acts of:
   realizing a flow of fluid through a beverage ingredient containing member of a particular type;
   measuring at least one characteristic of the flow which is influenced by a flow resistance of the beverage ingredient containing member;
   comparing the measured flow characteristic to a set of predetermined flow characteristics associated with the various types of beverage ingredient containing members; and
   determining at least one parameter for a further process of making a beverage by selecting a parameter related to the predetermined flow characteristic to which the measured flow characteristic is closest.

2. The method according to claim 1, wherein the realizing act includes an act of pumping the fluid by a pumping device.

3. The method according to claim 2, wherein the predetermined flow characteristics represent characteristics of a working point including a combination of flow and pressure points which are both within a working range of the pumping device and a range of combinations of flow and pressure related to the flow resistance of the beverage ingredient containing member.

4. The method according to claim 1, wherein the measured characteristic of the flow is at least one of the flow and a pressure of the fluid.

5. The method according to claim 1, wherein at least one parameter includes at least one of temperature, the flow, pressure and quantity of the fluid to be conducted through the beverage ingredient containing member, variation of the temperature, the flow and/or pressure over time, a pre-wetting parameter, and pumping time.

6. The method according to claim 1, wherein the beverage ingredient containing member is selected from a group comprising a pad, a cup, a capsule and a cartridge.

7. The method of claim 1, wherein the determining act further determines the particular type of the beverage ingredient containing member.

* * * * *